United States Patent
Verbin et al.

(10) Patent No.: US 10,700,738 B2
(45) Date of Patent: Jun. 30, 2020

(54) SYSTEM AND METHOD FOR MANAGING OPTIMIZATION OF VECTORING PERFORMANCE

(71) Applicant: Sckipio Technologies S.I LTD, Ramat Gan (IL)

(72) Inventors: Rami Verbin, Tel Aviv (IL); Guy Reina, Givatyaim (IL); Oren Mansour, Ramat Gan (IL)

(73) Assignee: Sckipio Technologies S.I LTD, Ramat Gan (IL)

( * ) Notice: Subject to any disclaimer, the term of this patent is extended or adjusted under 35 U.S.C. 154(b) by 0 days.

(21) Appl. No.: 15/771,734

(22) PCT Filed: Oct. 27, 2016

(86) PCT No.: PCT/IL2016/051157
§ 371 (c)(1),
(2) Date: Apr. 27, 2018

(87) PCT Pub. No.: WO2017/072765
PCT Pub. Date: May 4, 2017

(65) Prior Publication Data
US 2018/0316386 A1    Nov. 1, 2018

Related U.S. Application Data

(60) Provisional application No. 62/413,100, filed on Oct. 26, 2016, provisional application No. 62/246,616, filed on Oct. 27, 2015.

(51) Int. Cl.
*H04B 3/32* (2006.01)
*H04M 11/06* (2006.01)
(Continued)

(52) U.S. Cl.
CPC .......... *H04B 3/32* (2013.01); *H04B 3/04* (2013.01); *H04B 7/005* (2013.01); *H04B 7/0456* (2013.01);
(Continued)

(58) Field of Classification Search
CPC . H04B 3/04; H04B 3/32; H04B 7/005; H04B 7/0456; H04B 7/0617; H04L 25/03343; H04M 11/062
See application file for complete search history.

(56) References Cited

U.S. PATENT DOCUMENTS

2005/0123028 A1    6/2005  Cioffi et al.
2006/0029147 A1*   2/2006  Tsatsanis ............... H04B 3/32
                                                          375/267
(Continued)

FOREIGN PATENT DOCUMENTS

EP    2 755 333 A1    7/2014

OTHER PUBLICATIONS

International Search Report and Written Opinion dated Feb. 19, 2017 for International Application No. PCT/US2016/051157 (18 Pages).
(Continued)

*Primary Examiner* — Steven H Nguyen
(74) *Attorney, Agent, or Firm* — Brown Rudnick LLP

(57) ABSTRACT

A method for controlling optimization of vectoring performance, using precoding in the transmission of data between at least two transmitters and a plurality of receivers via a plurality of communication channels over a plurality of subcarrier frequencies, the method comprising determining communication performance for said communication channels collectively, by using default precoding parameters; comparing between said communication performance and corresponding service level agreement data associated with
(Continued)

each of said communication channels, thereby generating management control data; determining updated precoding parameters, according to said management control data; and applying said updated precoding parameters.

14 Claims, 5 Drawing Sheets

(51) Int. Cl.
  *H04B 3/04*    (2006.01)
  *H04B 7/005*   (2006.01)
  *H04B 7/0456*  (2017.01)
  *H04L 25/03*   (2006.01)
  *H04B 7/06*    (2006.01)
(52) U.S. Cl.
  CPC ..... *H04L 25/03343* (2013.01); *H04M 11/062* (2013.01); *H04B 7/0617* (2013.01)

(56) References Cited

U.S. PATENT DOCUMENTS

| | | | |
|---|---|---|---|
| 2010/0278033 A1* | 11/2010 | Ilani | H04L 5/0046 370/201 |
| 2014/0023127 A1* | 1/2014 | Pereira | H04B 3/32 375/224 |
| 2014/0211935 A1* | 7/2014 | Starr | H04B 3/32 379/406.08 |
| 2014/0341314 A1 | 11/2014 | Harel et al. | |
| 2015/0280892 A1 | 10/2015 | Verbin et al. | |
| 2017/0054473 A1* | 2/2017 | Jochen | H04B 3/32 |
| 2019/0058502 A1* | 2/2019 | Tsiaflakis | H04B 3/32 |

OTHER PUBLICATIONS

Ginis, George et al., "Vectored Transmission for Digital Subscriber Line Systems", IEEE Journal on Selected Areas in Communications, vol. 20, No. 5, Jun. 2002, pp. 1085-1104 (20 Pages).
Supplementary European Search Report dated Feb. 26, 2019 for European Application No. EP 16859204.

* cited by examiner

SYSTEM AND METHOD FOR MANAGING OPTIMIZATION OF VECTORING PERFORMANCE

FIELD OF THE DISCLOSED TECHNIQUE

The disclosed technique relates to communication systems and methods in general, and to a system and method for optimizing vectoring performance.

BACKGROUND OF THE DISCLOSED TECHNIQUE

One of the most common vectoring schemes is based on linear manipulation of transmission signals across communication lines on the service provider ("network") side. This is generally referred to as linear precoding. One of the most common schemes for setting coefficients in linear precoding is the zero-forcing approach. This approach is based on the inversion of the channel matrix. The downside of this approach is high performance loss in cases where the far end cross-talk (FEXT) level is considered high. As FEXT level increases with frequency, it is common that performance loss increases as well. To illustrate an example of this phenomenon, reference is made to FIG. 1, which is a bar graph representing an example comparison of prior art performance between the bitrate per single line versus multi-line with precoding for 20 twisted-wire pairs of 300 meters in cable length. The vertical axis in the bar graph of FIG. 1 represents the bitrate in Mbps, while the horizontal axis represents the number of communication lines. It can be noted that:

There is a large difference (gap) between the possible bitrate when each line is active alone and the case where all the lines are active (and precoding is enabled).

The variation between the achievable bitrate per line is very high.

Various prior art methods exist to further improve performance of linear precoding, however, these methods may be considered of limited benefit for "inferior" communication lines where the cross-talk level is considered high. Furthermore, these prior art methods typically endeavor to maximize a bitrate sum over all communication lines in the vectored group. This may not be consistent with the service provider's business model or commitment of service to the end user. The service provider is typically committed to provide a certain level of service throughput (e.g., bitrate). As such, the service provider may be interested in exceeding a committed service bitrate threshold. Bitrates below this threshold signify that the end user is not receiving the assured service, whereas bitrates above this threshold do not generally contribute any additional revenues to the service provider.

An alternative prior art precoding method is non-linear precoding, based for example on the Tomlinson-Hiroshima precoding (THP) modulo scheme. Although the bitrate losses with the THP modulo scheme due to high FEXT scenarios are lower (compared with linear precoding), still the bitrate variation between the different communication lines may still be of concern. THP (similarly with linear precoding) attempts to maximize the bitrates of different communication lines, with no effort to improve individual communication lines considered to be "inferior".

BRIEF DESCRIPTION OF THE DRAWINGS

The disclosed technique will be understood and appreciated more fully from the following detailed description taken in conjunction with the drawings in which.

SUMMARY OF THE PRESENT DISCLOSED TECHNIQUE

Figure 1:
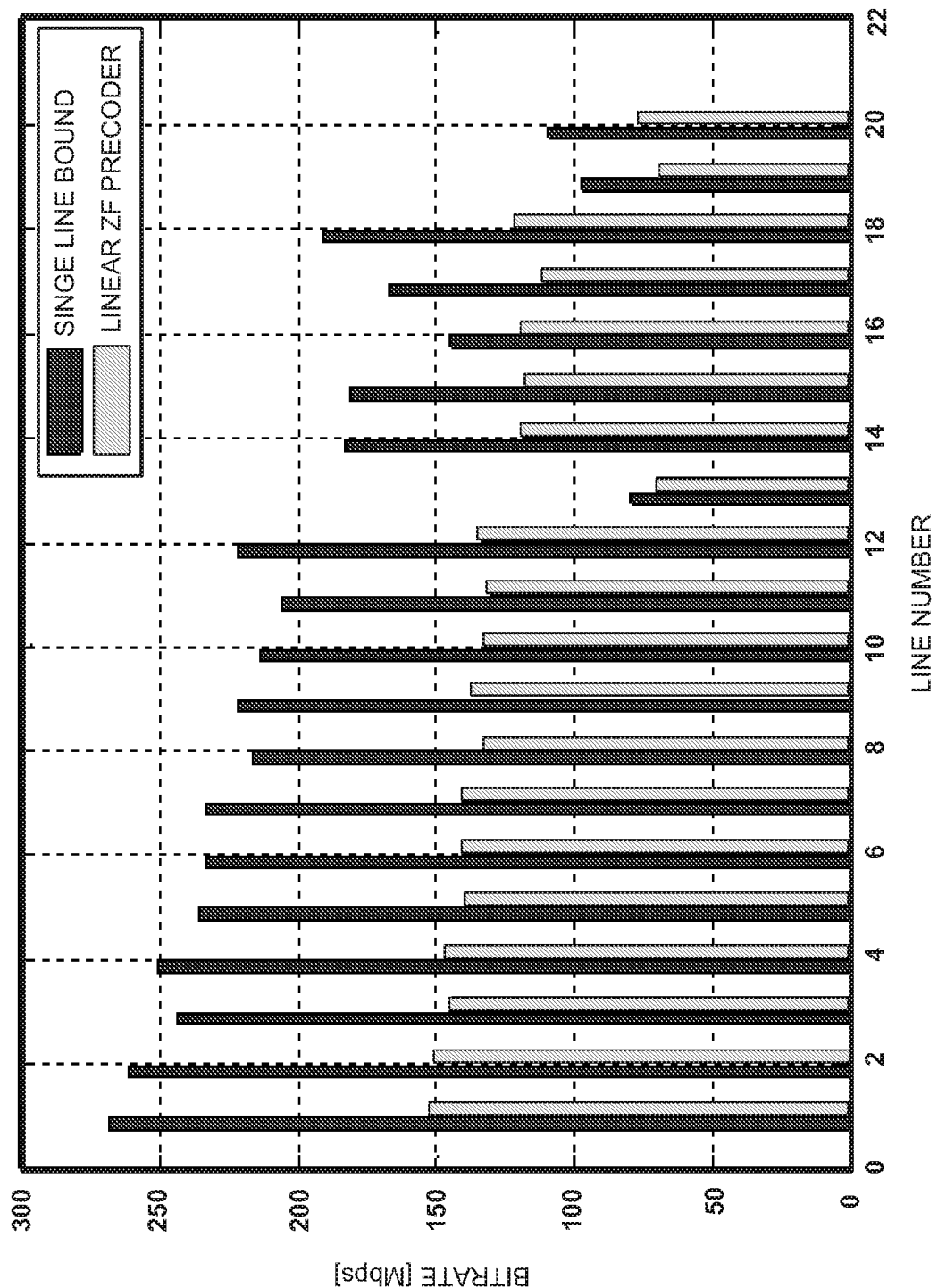
FIG. 1 is a bar graph representing an example comparison of prior art performance between the bit-rate per single line versus multi-line with precoding for 20 pairs of 300 m cable length.

The disclosed technique overcomes the disadvantages of the prior art by providing a method for controlling optimization of vectoring performance, using precoding in the transmission of data (in the downstream direction) between at least two transmitters and a plurality of receivers via a plurality of communication channels over a plurality of subcarrier frequencies. The method includes the following steps, including determining communication performance for the communication channels collectively, by using a default precoder. The method compares between the communication performance and corresponding service level agreement data associated with each of the communication channels, thereby generating management control data. The method then determines an updated precoder, according to the management control data, and applies the updated precoder.

According to another aspect of the disclosed technique there is thus provided a system for controlling optimization of vectoring performance, using precoding in the transmission of data between at least two transmitters and a plurality of receivers via a plurality of communication channels over a plurality of subcarrier frequencies, the system includes a vectoring control entity configured to be coupled with at least part of the at least two transmitters. The vectoring control entity is configured to determine communication performance for the communication channels collectively, by using a default precoder. The vectoring control entity has an ability to be communicatively coupled with a management processor. The management processor is configured for communicating data with the vectoring control entity, and for comparing between the communication performance and corresponding service level agreement data associated with each of the communication channels, thereby generating management control data. The vectoring control entity is configured to determine an updated precoder, according to at least part of the management control data, and to apply the updated precoder.

According to a further aspect of the disclosed technique, there is thus provided a system for controlling optimization of vectoring performance, using precoding in the transmission of data between at least two transmitters and a plurality of receivers via a plurality of communication channels over a plurality of subcarrier frequencies. The system includes a management processor having an ability to communicate data with a vectoring control entity. The vectoring control entity is configured to be coupled with at least part of the at least two transmitters. The vectoring control entity is configured to determine communication performance for the communication channels collectively, by using a default precoder. The management processor is configured for comparing between the communication performance and corresponding service level agreement data associated with each of the communication channels, thereby generating management control data. The vectoring control entity is configured to determine an updated precoder, according to at least part of the management control data, and to apply the updated precoder.

According to another aspect of the disclosed technique there is thus provided a method for controlling optimization of vectoring performance in the transmission of data (in the upstream direction) between a plurality of transmitters and at least two receivers via a plurality of communication channels over a plurality of subcarrier frequencies. The method includes determining communication performance for the communication channels collectively, by using default far-end crosstalk (FEXT) cancellation parameters. The method compares between the communication performance and corresponding service level agreement data associated with each of the communication channels, thereby generating management control data. The method then determines updated FEXT cancellation parameters, according to the management control data, and applies the updated cancellation FEXT parameters.

DETAILED DESCRIPTION OF PREFERRED EMBODIMENTS

The disclosed technique overcomes the disadvantages of the prior art by proposing a method and system for managing optimization of vectoring performance in a digital subscription line (DSL) transceiver network, in which each network device, e.g., distribution point unit (DPU) is connected to a plurality of customer equipment entities (CPEs) via a plurality of respective communication lines. These communication lines, which are essentially twisted-pairs bundled together in a binder are subject to far-end crosstalk (FEXT) that adversely affects communication performance, such as bitrate. Some of these communication lines (interchangeably referred herein as "communication channels") would be considered and designated by the relative terms "inferior", "superior", and "intermediate", distinguished by the level of noise which they exhibit. These so-called "superior" communication lines exhibit relatively far less noise levels than "inferior" communication lines. The objective of the disclosed technique is to control optimization of vectoring performance such that the precoding scheme that is used matches, meets, or at least attempts to converge with the way in which the service provider defines its service (e.g., via "service parameters" or "control parameters"). One method is to employ a class of balancing or tradeoff techniques that raise communication performance of inferior communication lines that are below their respective service bitrate threshold (e.g., bitrate), while concurrently lowering communication performance of superior communication lines that surpass their respective service bitrate threshold. A set of control parameters are used by the service provider to shape, configure or define the optimization and adapt it to its needs. For example, a particular set of configuration parameters will have impact on what communication lines (or "lines" for short) provide service to customers and what lines cannot be used to provide service to the customer (e.g., "inactive lines"). Inactive lines can still be used to assist other lines (e.g., operative lines that provide service) that are connected to a valid operational CPE, so as to improve its performance.

Basically, various methods may be used to balance or equalize the communication performance of the various lines. As will be described in greater detail hereinbelow, some of these methods include, for example:

Transmission over one line (or few subcarrier frequencies (carriers) of this line) in order to improve communication performance of another line by taking advantage of the cross-talk channel. In more general terms this technique can be described as beam forming.

Eliminating or not using some lines completely if they cannot pass the (required) service threshold. In this case, some lines will not "participate" (i.e., are excluded) in the bitrate optimization process.

Configuring the order in which a non-linear precoder precodes data pertaining to the different lines to give priority to some inferior communication lines. This is typically achieved by changing the order of the rows and/or columns of the channel matrix before calculating the non-linear precoder. The result is that the lines are precoded in a new order which can be selected to improve performance of inferior communication lines while possibly degrading performance of superior communication lines.

It is important at this point to distinguish between two distinct matters: (1) the optimization process or algorithm itself; and (2) the controlling or managing of optimization of vectoring performance. The first matter (1) concerns an algorithm, the second (2) concerns how to use, select, control, and apply the optimization process for the purpose of enhancing vectoring performance.

According to one aspect of the disclosed technique there is thus provided a method for controlling the optimization of vectoring performance, using precoding in the transmission of data (in the downstream direction) between at least two transmitters and a plurality of receivers via a plurality of communication channels over a plurality of subcarrier frequencies. The method includes the steps of determining communication performance for the communication channels collectively, by using a default precoding parameters (i.e., default, preset, existent precoding parameters); comparing between the communication performance and corresponding service level agreement data associated with each of the communication channels, thereby generating management control data; determining updated precoding parameters, according to the management control data; and applying the updated precoder parameters.

According to another aspect of the disclosed technique there is thus provided a system for controlling optimization of vectoring performance in the transmission of data between at least two transmitters and a plurality of receivers via a plurality of communication channels over a plurality of subcarrier frequencies. The system includes a vectoring control entity (VCE) configured to be coupled with at least part of at least two transmitters. The VCE is configured to determine communication performance for communication channels collectively, by using a default precoder (default precoding parameters), and has the ability to be communicatively coupled with a management processor. The management processor is configured for communicating data with the VCE, and compare between the communication performance and corresponding service level agreement data associated with each of the communication channels, thereby generating management control data. The VCE is configured to determine an updated precoder (updated precoding parameters), according to at least part of the management control data, and to apply the updated precoder.

According to a further aspect of the disclosed technique there is thus provided a system for controlling optimization of vectoring performance in the transmission of data between at least two transmitters and a plurality of receivers via a plurality of communication channels over a plurality of subcarrier frequencies. The system includes a management processor having ability to communicate data with a vectoring control entity (VCE) that is configured to be coupled with at least part of the at least two transmitters. The VCE is configured to determine communication performance for the communication channels collectively, by using a default precoder (default precoding parameters). The management processor is configured to compare between the communication performance and corresponding service level agreement data associated with each of the communication channels, thereby generating management control data. The VCE is configured to determine an updated precoder (updated precoding parameters), according to at least part of the management control data, and to apply the updated precoder.

In terms of implementation, the system includes both VCE and management processor embodied in a single device. According to an alternative implementation, VCE and management processor are embodied as separate devices (e.g., that can be remote from one another) having ability to be communicatively coupled with each other (e.g., via a network, Internet, communication link, etc.).

Similarly to the downstream direction where precoding is performed, the disclosed technique of controlling optimization of vectoring performance is likewise applicable, configured and operative in the upstream direction, where far-end crosstalk (FEXT) cancelling is performed. Accordingly, this aspect of the disclosed technique provides a method for controlling optimization of vectoring performance in the transmission of data (in the upstream direction) between a plurality of transmitters and at least two receivers via a plurality of communication channels over a plurality of subcarrier frequencies. The method includes determining communication performance for the communication channels collectively, by using default far-end crosstalk (FEXT) cancellation parameters. The method compares between the communication performance and corresponding service level agreement data associated with each of the communication channels, thereby generating management control data. The method then determines updated FEXT cancellation parameters, according to the management control data, and applies the updated FEXT cancellation parameters.

Figure 2:
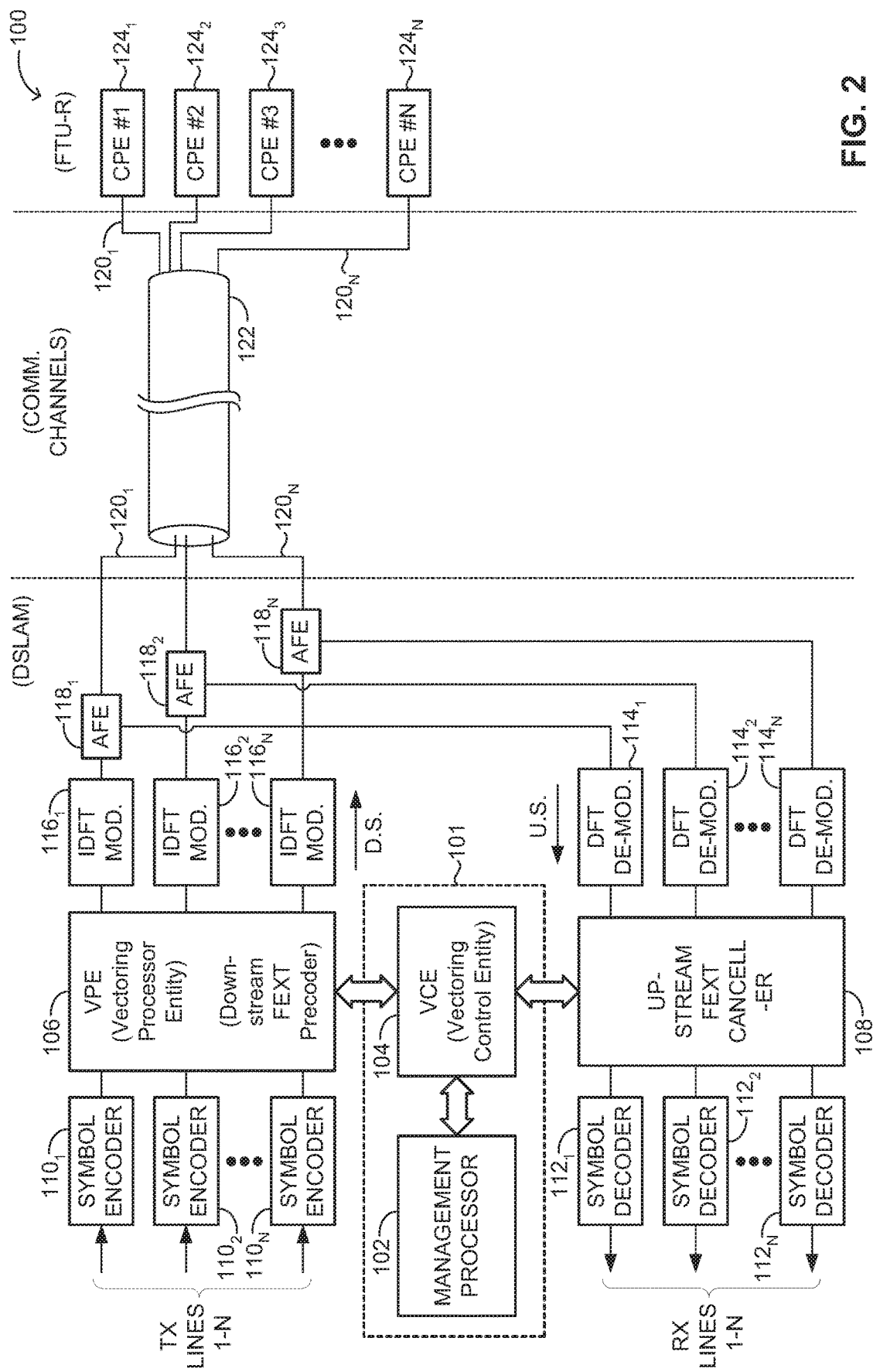
FIG. 2 is a schematic block diagram illustrating a simplified general overview of a communication system embodying the disclosed technique, constructed and operative in accordance with an embodiment of the disclosed technique.

Reference is now made to FIG. 2, which is a schematic block diagram illustrating a simplified general overview of a communication system, generally referenced 100, embodying the essence of the disclosed technique, generally referenced 101, constructed and operative in accordance with an embodiment of the disclosed technique. FIG. 2 shows a schematic block diagram of an exemplary G.fast system (G series ITU-T recommendation for fast access to subscriber terminals), or a family of G.fast systems, for the distribution point (DP) network side, supporting precoding and FEXT cancellation. On the left side of a left vertical dotted line in FIG. 2 is a DSLAM (digital subscriber line access multiplexer) side, also denoted interchangeably herein as "DP side", "network side", "DP network side", and distribution point unit (DPU). The middle portion in FIG. 2 (i.e., in between left and right vertical dotted lines) are the communication channels illustrated by a binder 122 that enfolds twisted-wire electrical conductor pairs (not shown), and which connects the DP side to a CPE (customer premises equipment) side, shown on the right of the right vertical line. The CPE side, also denoted interchangeably herein as "CPEs", "subscriber side", "FTU-R" (G.fast transceiver unit—remote terminal (site)) includes a plurality of CPEs $124_1, 124_2, 124_3, \ldots, 124_N$ (N independent transceivers, where "N" is a positive integer representing the number of supported communication channels between the DP side and the CPE side).

Communication system 100 includes the essence of the disclosed technique (its hardware symbolically represented by 101), which is mainly embodied by a management processor 102 and a vectoring control entity (VCE) 104 (also termed interchangeably herein "vectoring control processor"), having the ability and configured to be in communication with each other, as will be described in greater detail hereinbelow. A general description of FIG. 2 will be followed by a more detailed description of the disclosed technique. Arbitrarily beginning in the downstream (DS) direction, DSLAM receives a data stream (bit stream—not shown) typically from a broadband remote access server (BRAS) (not shown) via N symbol encoders $110_1, 110_2, \ldots, 110_N$, for each of N transmission (TX) lines 1 through N. Symbol encoders $110_1, 110_2, \ldots, 110_N$ are configured and operative to parse the incoming bit stream into groups designated to modulate different subcarrier frequencies of a discrete multi-tone (DMT) signal (not shown) (symbols). A down-stream FEXT precoder also termed interchangeably herein as "vectoring processor entity" (VPE), and "vectoring processor" 106 is coupled with symbol encoders $110_1, 110_2, \ldots, 110_N$, VCE 104, and with IDFT (inverse discrete Fourier transform) modulators $116_1, 116_2, \ldots, 116_N$. Down-stream FEXT precoder 106 is configured and operative to receive individual outputted encoded symbols from each of symbol encoders $110_1, 110_2, \ldots, 110_N$ and to precode them (i.e., the constellation points of a transmitted symbol per subcarrier frequency) using precoding coefficients supplied by VCE 104. IDFT modulators $116_1, 116_2, \ldots, 116_N$ are each configured to receive the precoded symbols per communication line from VPE 106 and to modulate (i.e., in the frequency domain) complex values of precoded symbols onto DMT subcarrier frequencies (i.e., represented in the time domain). Each of IDFT modulators $116_1, 116_2, \ldots, 116_N$ are respectively coupled with analog front end (AFE) units $118_1, 118_2, \ldots, 118_N$ (i.e., for communication line 1, IDFT modulator $116_1$ is coupled with AFE $118_1$, for communication line 2, IDFT modulator $116_2$ is coupled with AFE $118_2$, and so forth). The AFEs are configured and operative to receive and to convert the modulated precoded symbols from their respective IDFT modulators from digital form to analog form enabling their transmission via communication lines over to the CPE side. Each AFE is communicatively coupled with a respective CPE via a specific communication line. In particular, AFE $118_1$ is coupled with CPE $122_1$ via communication line $122_1$, AFE $118_2$ is coupled with CPE $122_2$ via communication line $122_2$, and likewise through to N.

In the upstream (US) direction, each of CPEs $124_1, 124_2, \ldots, 124_N$ is configured and operative to transmit signals via its respective communication line $120_1, 120_2, \ldots, 120_N$ toward the DP side where the respective AFEs receive these signals and convert them into digital form. Each of AFEs $118_1, 118_2, \ldots, 118_N$ are further respectively coupled with discrete Fourier transform (DFT) demodulators $114_1, 114_2, \ldots, 114_N$, which in turn demodulate the signals received from the AFEs. An upstream FEXT canceller 108, which is coupled with DFT demodulators $114_1, 114_2, \ldots, 114_N$ as input and symbol decoders $112_1, 112_2, \ldots, 112_N$ as output, is configured and operative to receive the demodulated signals from DFT demodulators $114_1, 114_2, \ldots, 114_N$ and further to cancel the effects of upstream FEXT by using canceller coefficients that VCE 104 provides. Symbol decoders $112_1, 112_2, \ldots, 112_N$ are configured and operative to receive the FEXT-cancelled demodulated signals (for each of N lines separately) and to decode these signals to extract the individual data frames. According to one configuration, management processor 102 and VCE 104 are part of a single entity, e.g., a DPU. According to another configuration, management processor 102 and VCE 104 are remote to each other (e.g., not part of a single entity) although both have the ability to be communicatively coupled with each other for communicating data therebetween (e.g., a remote computer, coupled via a network, etc.).

Figure 3:
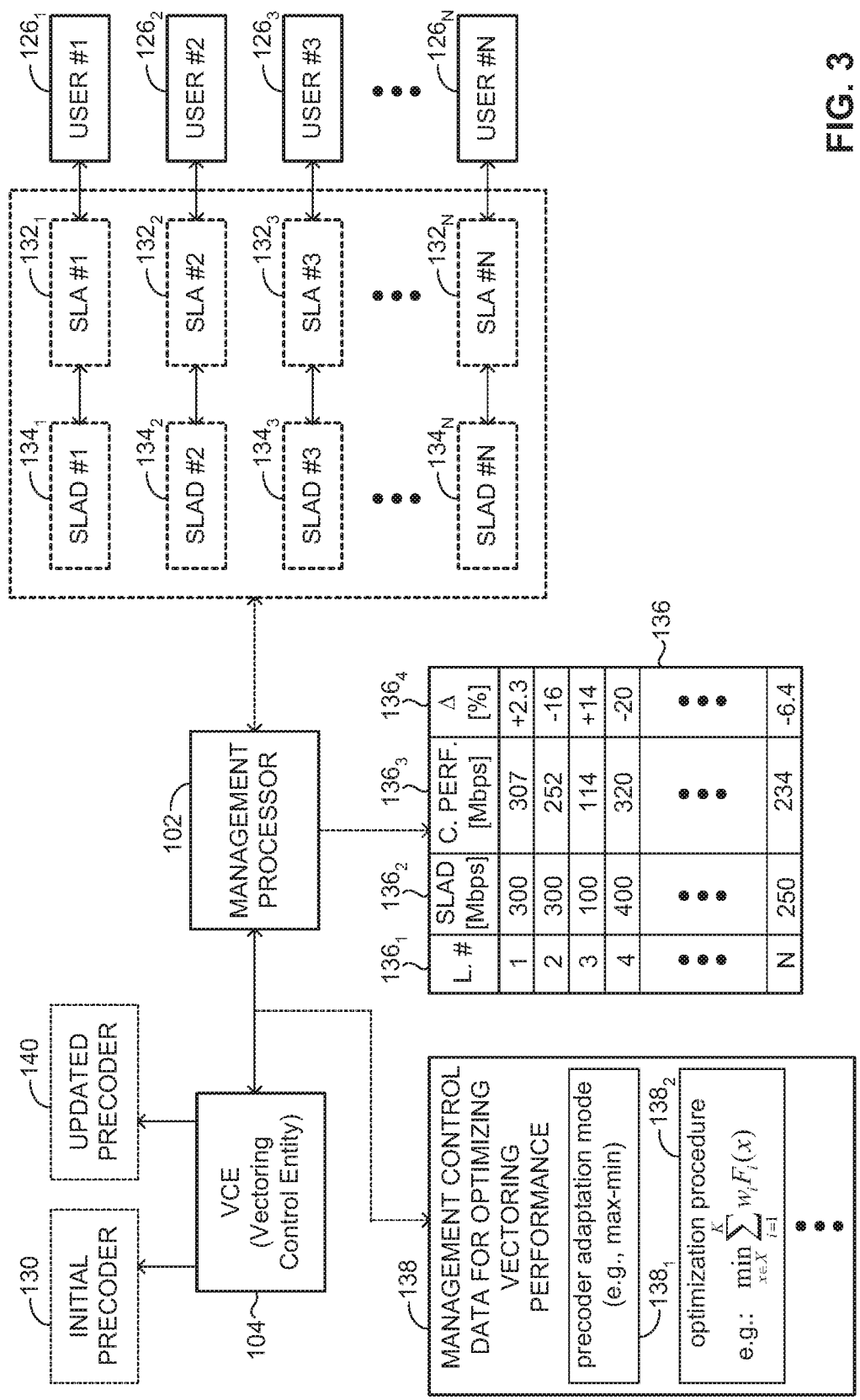
FIG. 3 is a schematic diagram illustrating a functional overview of the disclosed technique.

Reference is now further made to FIG. 3, which is a schematic diagram illustrating a functional overview of the disclosed technique. Vectoring control entity 104 is configured and operative in defining and configuring VPE 106 in the downstream direction, and upstream FEXT canceller 108 in the upstream direction (FIGS. 2 and 3). Initially, VCE 104 may employ an initial or default precoding 130 (i.e., by a default precoder, e.g., a precoder set by the zero-forcing approach, an existing precoder based on a plurality of different initial weights (i.e., weight for the bitrate of each line) for the various communication lines, set by a weighted zero-forcing approach, set by non-linear precoding, and the like) (FIG. 3). A plurality of precoding coefficients (parameters) or plainly "precoder" is calculated based on the channel matrix, H, which may be of full size N×N or of partial size, for each of the subcarrier frequencies and other prevailing channel characteristics (e.g., noise, signal-to-noise ratio (SNR)) of the communication channels. VPE 106 determines a downstream FEXT precoder matrix from the channel information, in order to minimize FEXT in each of the communication channels. In various circumstances, the default or currently used precoder (precoder parameters) may not be optimal in terms of expected target parameters, such as bitrate, attainment of service level agreement parameters for each of the CPEs, and the like. In order to control the optimization (i.e., which in the context of the disclosed technique may be regarded as a relative term, not necessarily absolute), management processor 102 is configured and operative to provide management control data to VCE 104 via at least one interface (shown in FIGS. 2 and 3 by double-sided arrows).

Generally, for each subscriber ("end user", "service user" or simply "user" for short) of a digital subscriber line (DSL) service there is a corresponding service-level agreement (herein denoted "SLA"), which defines aspects of the service (such as technical (e.g., bitrate), legal (e.g., responsibilities), etc.) that is agreed between the service provider and the service user. The service provider is obligated to provide service user with the level of service detailed in the SLA. Let's assume a service provider has a plurality of N SLAs with N respective service users $126_1, 126_2, \ldots, 126_N$. Each service user is associated with a particular respective communication line. For example, service user #1 $126_1$ (FIG. 3) employs communication line $120_1$ (FIG. 2) having associated therewith SLA $132_1$ (FIG. 3), service user #2 $126_2$ employs communication line $120_2$ having associated therewith SLA $132_2$, and so forth to N. Each SLA is at least partially defined by service-level agreement (technical) data (herein denoted "SLAD") that specifies the various technical parameter commitments by service provider to the service user, such as bitrate, throughput, and the like. Particularly, FIG. 3 shows that SLA $132_1$ is associated with (and at least partly defined by) SLAD $134_1$, SLA $132_2$ is associated with (and at least partly defined by) SLAD $134_2$, and so forth to N.

Management processor 102 is configured and operative to receive at least a portion of SLAD corresponding to each of the N customers (i.e., service users). Table 136 illustrates a representative example of SLAD $136_2$ (e.g., without loss of generality, the bitrate in Mbps) corresponding to each of the communication lines $136_1$ (which in turn corresponds to each of the CPEs, the SLAs and the service users). For example, the first row (i.e., below the header row) in table 136 shows that SLAD $134_1$ corresponds to communication line #1 $120_1$ (associated with user $126_1$) specifies a bit-rate of 300 Mbps, row 2 shows that SLAD $134_2$ corresponds to communication line #2 $120_2$ (associated with user $126_2$) specifies a bitrate of 300 Mbps, and so forth. Management processor 102 is further configured and operative to accept from VCE 104 communication performance of N communication channels (lines) collectively, when the precoder (VPE 106) employs initial precoder 130. Table 136 representatively illustrates the determined communication performance $136_3$ (denoted for brevity "C. Perf.") for each of the communication lines. The communication performance may be assessed (e.g., measured, calculated or determined) according to bitrate, throughput, other measures, combination of measures, and the like. For elucidating the particulars of the disclosed technique, without loss of generality, the bitrate is chosen as an example measure of communication performance. Once communication performance is determined, management processor 102 is configured and operative to compare between the SLAD associated with each of the communication channels (i.e., associated with the corresponding users), with their corresponding communication performance (thereby yielding comparison data). Table 136 representatively illustrates comparison data $136_4$ (denoted "a" in percent). Based on at least the comparison data $136_4$ management processor 102 is configured and operative to produce management control data 138 that is communicated to VCE 104 via an interface. Management control data 138 is used by VCE 104 to determine and to apply an updated precoder 140 (i.e., updated precoding coefficients or parameters), so as to optimize vectoring performance (in the downstream direction). Similarly in the upstream direction, upstream FEXT canceller 108 is configured and operative to receive and use management data 138 from management processor 102, so as to cancel FEXT in the upstream direction.

A memory (not shown) is configured to be in data communication (e.g., coupled) with management processor 102 is configured and operative to store at least part of table 136, including SLAD, communication performance, and comparison data for corresponding to each communication line (CPE).

Vectoring control entity 104 is configured and operative to receive from management processor 102, via an interface therebetween, management control data 138, which includes various configuration parameters that enable VPE 106 to determine an updated precoder 140 for optimizing vectoring performance. VCE 104 determines the most suitable or applicable modality that would enable the optimization of vectoring performance, based on received management control data 138. Management control data 138 includes a plurality of modalities $138_1, 138_2, 138_3, \ldots$ that are utilized by vectoring processor to optimize vectoring performance. For example, management control data 138 includes:

A precoder adaptation mode $138_1$ such as maximum-minimum fairness ("max-min"), sum of bitrates (aggregate bitrate) over specified communication lines (users), etc.

Results yielded from an optimization process $138_2$ (also denoted herein interchangeably "optimization scheme"), which may include at least one optimization function, weights or coefficients yielded from the optimization process per communication line.

SLAD, including information such as the minimum bitrate per communication line, which may serve as a lower bound bitrate per communication line. Furthermore, VCE 104 may use this information to preserve the communication lines exhibiting relatively low communication performance (e.g., bitrate), compared to other communication lines in the vectored group so that the communication performance is not further diminished. In addition, VCE 104 may use this information to increase low communication performance exhibited by specific communication lines.

Information pertaining to which communication lines are provisioned and which are not. VPE 106 uses this information to yield an updated precoder 140 that maximizes the total aggregate capacity of only the provisioned and active communication lines.

VCE 104 is configured and operative to further receive additional contributory information relating to each and every line, so as to allow the VPE 106 to optimize performance of the entire vectored group (i.e., all communication lines under specified optimization criteria). This information includes, for example:

Communication line related information, such as attenuation data, noise data, achievable bitrate, and the like.

Downstream and upstream error reports, facilitating the estimation of the variability over time of the noise environment and the noise level per communication line.

VCE 104 is configured and operative to set the vectoring coefficients that are the result of an optimization process. Additionally, VCE 104 may also configure each CPE transceiver with parameters, such as:

Usable carriers, or frequency bands;
Bit-loading per carrier;
Gain per carrier.

According to one implementation, the control of optimization is performed manually, e.g., by a service manager (i.e., by monitoring the communication performances of the service lines and adapting (e.g., fine tuning) them to better meet the service requirements, service commitments, and the like. According to another implementation, the control of the optimization is performed automatically, via a computer running an algorithm based on decision rules (e.g., that determine when and which communication lines follow the max-min fairness algorithm). Alternatively, the control of optimization is achieved partly manually and partly automatically.

There are various optimization schemes that may be employed. According to one example, multiple criteria ("multi-criteria") optimization is employed in which multiple criteria or constraints are combined so as to formulate a single weighted criterion. An example of such a technique is linear scalarization where multiple objectives are formulated in terms of a single objective problem such that optimal solutions of the combined single objective are (in a way) optimal solutions to the multiple objective problems. An example expression for a linear scalarization multiple objective optimization is given by minimizing the sum of the linear combination:

$$\min_{x \in X} \sum_{i=1}^{K} w_i F_i(x), \qquad (1)$$

where $F_i(x)$ are functions representing i objectives as a function of variable x (i being a running index, K being the number of objectives, both positive integers), $w_i > 0$ are weights or coefficients corresponding to the objectives, and X is a set depending on the functions. Alternatively, the optimization problem may also be formulated in terms of a convex optimization problem (e.g., a second-order cone program), a convex-concave algorithm for maximizing a weighted sum rate, and the like.

According to another example, the optimization process utilizes a maximum-minimum ("max-min") fairness algorithm, so as to increase communication performance for inferior communication lines exhibiting a bitrate (or other measure such as throughput) that is below the minimum committed service bitrate threshold of the service provider, and concurrently, to decrease communication performance for superior communication lines exhibiting a bitrate that is above the minimum committed service bitrate threshold associated with those communication lines. In this case, management processor 102 provides VCE 104 with management control data 138 pertaining to max-min fairness parameters (e.g., defining lower rate threshold that all active lines shall exceed. Lines under this threshold are disabled while the rate of the weakest active line in maximized), which VCE 104 uses in determining the vectoring coefficients. A typical outcome achieved by using max-min is exhibited in a greater minimum throughput than when using equal weighting for the rates of the different lines.

Figure 4:
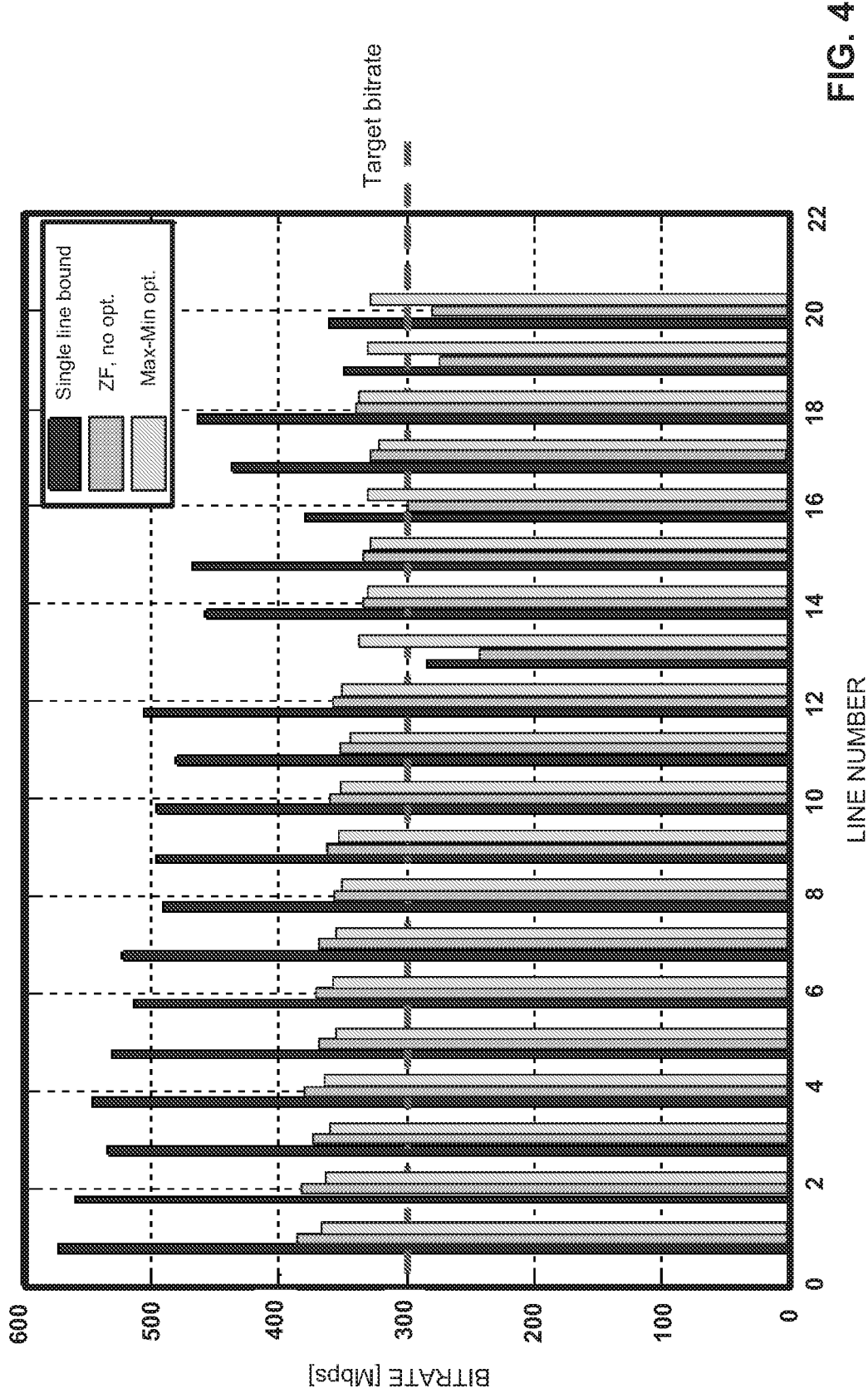
FIG. 4 is a bar graph representing an example of the output using an optimization scheme, in accordance with the embodiment of the disclosed technique.

Experimental results attained by employing the system and method of the disclosed technique are demonstrated in the example shown in FIG. 4, which is a bar graph representing an example of the output using an optimization scheme, in accordance with an embodiment of the disclosed technique. The vertical axis in the graph of FIG. 4 represents the bitrate in Mbps, while the horizontal axis represents the number of communication lines. The target bitrate (represented by the horizontal dashed line) in this example is 300 Mbps. The example shown in FIG. 4 illustrates the results prior to the optimization as well as the outcome of the optimization process. In particular, the solid bars represent single line bound performance of each communication line (number) individually. The cross-hatched bars represent performance when employing a default precoder set according to the zero-forcing (ZF) approach. The hatched bars represent the performance when employing the max-min approach. The results show that performance of all of the communication lines converge toward a rather small tolerance. In other words, the performance of the "inferior" communication lines (i.e., exhibiting relatively lower communication performance with respect to others) has improved. The communication performance of the "superior" lines has degraded.

Figure 5:
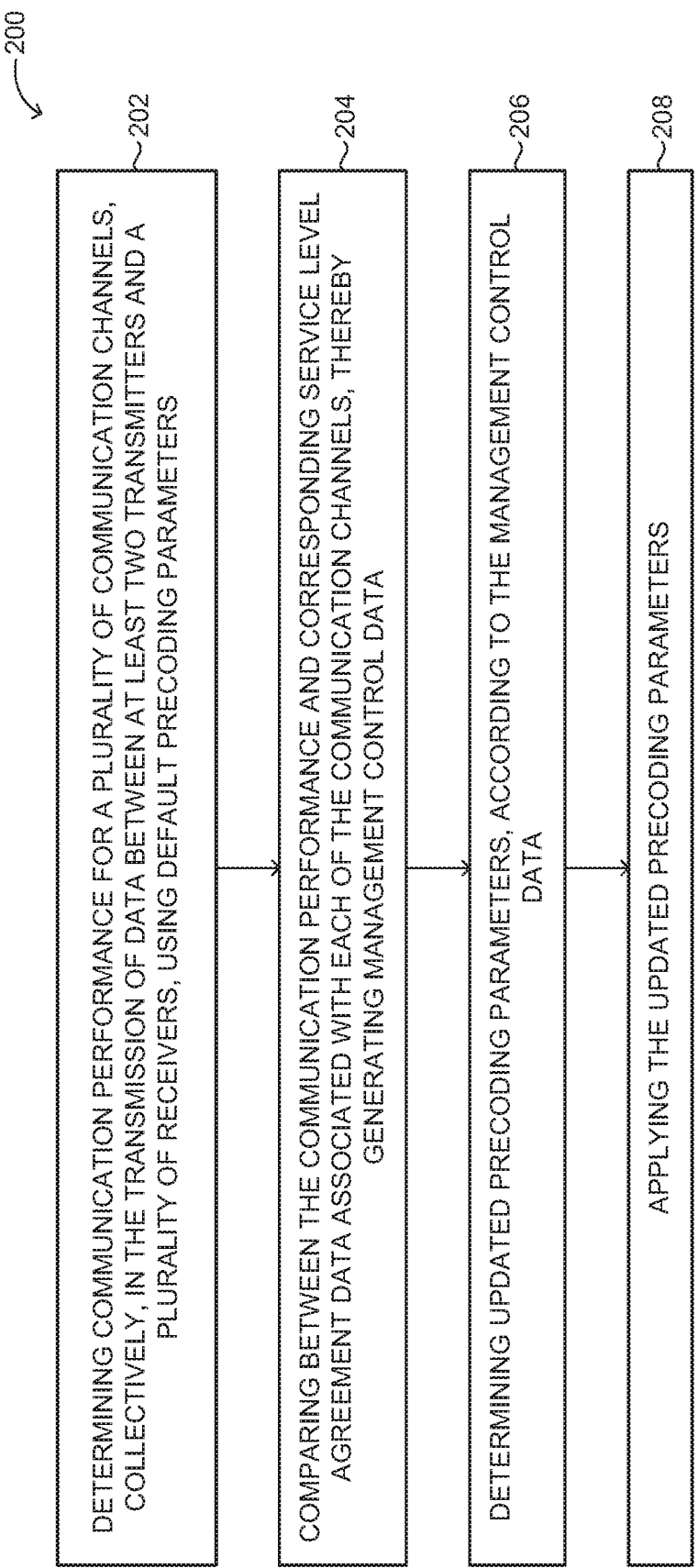
FIG. 5 is a schematic block diagram of a method for controlling the optimization of vectoring performance, constructed and operative in accordance with the disclosed technique.

Reference is now further made to FIG. 5, which is a schematic block diagram of a method, generally referenced 200, for controlling the optimization of vectoring performance, constructed and operative in accordance with the disclosed technique. In procedure 202, communication performance for a plurality of communication channels is determined collectively, in the transmission of data between at least two transmitters and a plurality of receivers, using default precoding parameters. With reference to FIGS. 2 and 3, management processor 102 determines communication performance for a plurality of N communication channels (lines) $120_1, \ldots, 120_N$, in transmission of data between at least two transmitters (of DSLAM) and a plurality of receivers, CPEs $124_1, \ldots, 124_N$, using default (present or initial) precoding (i.e., default precoder 130 (FIG. 3)).

In procedure 204, communication performance and corresponding service level agreement data (SLAD) associated with each of the communication channels is compared, thereby generating management control data. With reference to FIGS. 2 and 3, management processor 102 compares communication performance $136_3$ (FIG. 3) with corresponding SLAD $134_1$, SLAD $134_2, \ldots$, SLAD $134_N$ associated respectively with each of communication lines $120_1, \ldots, 120_N$. Management processor 102 generates management control data 138.

In procedure 206, updated precoding parameters are determined, according to the management control data. With reference to FIGS. 2 and 3, VCE 104 determines updated precoding parameters (coefficients) (i.e., updated precoder 140), according to management control data 138.

In procedure 208, the updated precoding parameters are applied. With reference to FIGS. 2 and 3, VCE 104 applies the updated precoding parameters (coefficients) (i.e., updated precoder 140) to downstream FEXT precoder 106, in the downstream direction. Likewise In the upstream direction, VCE 104 applies updated FEXT cancelling parameters to upstream FEXT canceller 108.

The disclosed technique is highlighted by the following features.

The method and system of the disclosed technique proposes the management or control of optimizing vectoring performance via multi-point to multi-point communication channels that exhibit FEXT over a plurality of subcarrier frequencies.

The method and system of the disclosed technique employ precoding techniques (linear precoding, non-linear precoding) to mitigate performance losses due to (FEXT) transpiring between the communication lines.

The method and system of the disclosed technique are configured and operative to optimize G.fast type precoders for the data communication over a plurality of twisted-pairs.

The method and system of the disclose technique involve defining and configuring the transceivers (e.g., at the DPU side of the network) so as to facilitate prioritization of attaining higher bitrates to those communication lines exhibiting relatively lower bitrates ("inferior lines") over lines exhibiting higher bitrates ("superior lines"), based on various criteria e.g., max-min criteria. Configuration parameters used to configure the transceivers may be determined based on service requirements. The following are examples of implementation techniques:

The system and method of the disclosed technique involves specifying and determining the optimization mode, e.g., max-min, max-sum, or other criteria based on a combination of the listed rules. The optimization criteria may be applied to a specified group of customers (i.e., users), where different rules may apply to different groups of customers.

The disclosed technique involves specifying a minimum service bitrate per customer (CPE). If this minimum service bitrate is not achievable, the customer may not get any service and the transmitter port connected to it may be used for other purposes, such as optimizing the communication performance of other communication lines via the precoder and the cross-talk channel.

The disclosed technique involves designating specific communication lines for which performance has to be optimized.

The disclosed technique involves allocating a part of a spectrum of superior communication lines to improve communication performance of inferior communication lines. Applying this approach to multiple communication lines facilitates bitrate equalization, in which bitrates of the various lines are optimized together to be all above a specified service threshold.

The disclosed technique involves allocating or associating weights per line or group of lines in a vectoring group to facilitate the optimization process. Granting a greater weight to inferior communication lines and a smaller weight to superior communication lines may achieve an evener impact or effect on overcoming the optimization problem. Inferior communication lines receive higher priority over superior communication lines, resulting in a lower variation and greater equalization of bitrates, thereby bringing about a significant improvement in the communication performance of the inferior communication lines.

The disclosed technique involves defining and controlling transceiver configuration parameters so as to control bitrate optimization process; these parameters are set via a transceiver management interface. The transceiver management interface may be implemented as a physical interface (e.g., at least one communication link, communication line such as a dedicated management interface), in-band over data interface(s) (i.e., embedded into data), and the like.

The disclosed technique involves the use of linear precoding or non-linear precoding (e.g., Tomlinson-Hiroshima (TH) modulo based precoding).

The disclosed technique may employ at least one of the following examples for implementing the above mentioned features:

a Elimination of transmission over some carriers of superior communication lines (e.g., enabling high bitrates) to facilitate improved performance over inferior communication lines (e.g., enabling high bitrates). In other words, the control of optimization involves selective application to at least one group of communication lines.

Elimination of transmission of data over some carriers of superior communication lines and use the power allowed for transmission over these carriers of the superior communication lines to improve the communication performance of the inferior communication lines. Conveying data relating to the inferior communication lines over the superior communication lines (for some carriers). The precoder matrix supporting this combination is calculated via a pseudo inverse method, where the number of inputs to the precoder matrix is larger than the number of precoder outputs (non-square precoder matrix). The control of optimization of vectoring performance may thus involve lowering communication performance of at least one group of communication lines, while concurrently raising the communication performance of at least another (different) group of communication lines.

The control of optimization of vectoring performance involves selecting which of the communication channels will transmit data over which of the subcarrier frequencies.

Setting the order in which precoding is performed for the communication lines such that the inferior communication lines (exhibiting a relatively low bitrate) will be granted with priority over the superior communication lines (exhibiting a relatively high bitrate).

Defining and selecting the precoding order of the communication lines (i.e., to better match the target service). This may be achieved by changing the order of the rows and/or columns of the channel matrix before calculating the non-linear precoder. The result is that the communication lines are precoded in a new order which can be selected to improve performance of inferior communication lines while possibly degrading performance of the superior communication lines. For example, inferior communication lines may be precoded before superior communication lines so that communication performances of inferior communication lines are enhanced while the communication performances of the superior communication lines are lowered.

The invention claimed is:

1. A method for controlling optimization of vectoring performance in the transmission of data between at least two transmitters and a plurality of receivers via a plurality of communication channels over a plurality of subcarrier frequencies, the method comprising:
   determining communication performance for said communication channels collectively, by using default precoding parameters;
   comparing between said communication performance and corresponding service level agreement data associated with each of said communication channels, thereby generating management control data;
   determining updated precoding parameters, for lowering said communication performance of at least one group of said communication channels, while concurrently raising said communication performance of at least another group of said communication channels, according to said management control data; and
   applying said updated precoding parameters.

2. The method according to claim 1, wherein said default precoding is selected from a list consisting of:
   set by a zero forcing approach;
   set by a weighted zero forcing approach; and
   set by a non-linear precoder.

3. The method according to claim 1, further comprising receiving at least a portion of said service level agreement data.

4. The method according to claim 1, wherein said management control data is selected from a list consisting of:
   precoder adaptation mode based on maximum minimum fairness;
   precoder adaptation mode based on sum of bitrates over specified said communication channels;
   results yielded from an optimization process including at least one of an optimization function, and weighting coefficients associated with said communication channels;
   service level agreement data;
   service level agreement data that includes a minimum bitrate for said communication channels; and
   information pertaining to which of said communication channels are provisioned, and not provisioned.

5. The method according to claim 1, wherein said controlling optimization of vectoring performance involves selective application to at least one group of said communication channels.

6. The method according to claim 1, wherein said controlling optimization of vectoring performance involves selecting which of said communication channels will transmit data over which of said subcarrier frequencies.

7. The method according to claim 1, wherein said controlling optimization of vectoring performance involves determining an order which said precoding is performed for said communication channels.

8. A system for controlling optimization of vectoring performance in the transmission of data between at least two transmitters and a plurality of receivers via a plurality of communication channels over a plurality of subcarrier frequencies, the system comprising:
   a vectoring control entity configured to be coupled with at least part of said at least two transmitters, said vectoring control entity is configured to determine communication performance for said communication channels collectively, by using a default precoder; and having ability to be communicatively coupled with a management processor that is configured for:
   communicating data with said vectoring control entity, comparing between said communication performance and corresponding service level agreement data associated with each of said communication channels, thereby generating management control data;
   said vectoring control entity configured to determine an updated precoder, for lowering said communication performance of at least one group of said communication channels, while concurrently raising said communication performance of at least another group of said communication channels, according to at least part of said management control data; and apply said updated precoder.

9. The system according to claim 8, wherein said vectoring control entity is further configured in configuring at least one of a vectoring processing entity in the downstream direction, and an upstream far end crosstalk (FEXT) canceller in the upstream direction.

10. The system according to claim 8, wherein said default precoder is selected from a list consisting of:
    set by a zero forcing approach;
    set by a weighted zero forcing approach; and
    set by a non-linear precoder.

11. The system according to claim 8, wherein said management control data is selected from a list consisting of:
    precoder adaptation mode based on maximum-minimum fairness;
    precoder adaptation mode based on sum of bitrates over specified said communication channels;
    results yielded from an optimization process including at least one of an optimization function, and coefficients associated with said communication channels;
    service level agreement data;
    service level agreement data that includes a minimum bitrate for said communication channels; and
    information pertaining to which of said communication channels are provisioned, and not provisioned.

12. The system according to claim 8, wherein said controlling optimization of vectoring performance involves selective application to at least one group of said communication channels.

13. The system according to claim 8, wherein said controlling optimization of vectoring performance involves selecting which of said communication channels will transmit data over which of said subcarrier frequencies.

14. The system according to claim 8, wherein said controlling optimization of vectoring performance involves determining an order which said precoding is performed for said communication channels.

* * * * *